(12) United States Patent
Van Zelst et al.

(10) Patent No.: US 9,860,037 B2
(45) Date of Patent: *Jan. 2, 2018

(54) METHOD AND APPARATUS FOR ORDERING SUB-FIELDS OF VHT-SIG-A AND VIT-SIG-B FIELDS

(75) Inventors: Albert Van Zelst, Woerden (NL); Vincent Knowles Jones, IV, Redwood City, CA (US); Hemanth Sampath, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 825 days.

This patent is subject to a terminal disclaimer.

(21) Appl. No.: 13/186,047

(22) Filed: Jul. 19, 2011

(65) Prior Publication Data

US 2012/0020261 A1   Jan. 26, 2012

Related U.S. Application Data

(60) Provisional application No. 61/366,276, filed on Jul. 21, 2010, provisional application No. 61/366,682, filed on Jul. 22, 2010.

(51) Int. Cl.
  *H04W 28/06* (2009.01)
  *H04L 5/00* (2006.01)
  *H04L 29/06* (2006.01)
  *H04W 84/12* (2009.01)
  *H04L 1/06* (2006.01)

(52) U.S. Cl.
  CPC ............. *H04L 5/003* (2013.01); *H04L 69/22* (2013.01); *H04W 28/065* (2013.01); *H04W 84/12* (2013.01); *H04L 1/0625* (2013.01); *H04L 1/0631* (2013.01)

(58) Field of Classification Search
  CPC .. H04W 28/065; H04W 84/12; H04L 1/0631; H04L 69/22; H04L 1/0625
  See application file for complete search history.

(56) References Cited

U.S. PATENT DOCUMENTS

| | | | |
|---|---|---|---|
| 8,325,644 B2 * | 12/2012 | Sampath et al. | ............. 370/312 |
| 2009/0156227 A1 | 6/2009 | Frerking et al. | |
| 2010/0107042 A1 | 4/2010 | Sawai et al. | |

(Continued)

FOREIGN PATENT DOCUMENTS

| | | |
|---|---|---|
| CN | 1816858 A | 8/2006 |
| JP | 2013509105 A | 3/2013 |

(Continued)

OTHER PUBLICATIONS

Stacey, Robert, "Proposed Specification Framework for TGac", Jul. 15, 2010, pp. 1-22, from the internet: https://mentor.ieee.org/802.11/dcn/09/11-09-0992-13-00ac-proposed-specification-framework-for-tgac. doc.*

(Continued)

*Primary Examiner* — Salvador E Rivas
(74) *Attorney, Agent, or Firm* — Patterson & Sheridan, LLP

(57) ABSTRACT

Certain aspects of the present disclosure relate to a technique of ordering sub-fields within Signal (SIG) fields of a preamble in Very High Throughput (VHT) wireless communications systems and to a technique of managing sizes of these sub-fields.

46 Claims, 8 Drawing Sheets

(56) References Cited

U.S. PATENT DOCUMENTS

| | | | |
|---|---|---|---|
| 2010/0260159 A1* | 10/2010 | Zhang | H04W 28/06 370/338 |
| 2011/0032875 A1 | 2/2011 | Erceg et al. | |
| 2011/0096797 A1 | 4/2011 | Zhang et al. | |
| 2011/0103280 A1 | 5/2011 | Liu et al. | |
| 2012/0044925 A1 | 2/2012 | Lee et al. | |

FOREIGN PATENT DOCUMENTS

| | | |
|---|---|---|
| JP | 2013513284 A | 4/2013 |
| WO | WO-2009109894 A1 | 9/2009 |
| WO | WO-2011050320 A1 | 4/2011 |
| WO | WO-2011068387 A2 | 6/2011 |

OTHER PUBLICATIONS

Zhang et al., "802.11ac Preamble Discussions" Nov. 16, 2009, pp. 1-10. from the internet: https://mentor.ieee.org/802.11/dcn/09/11-09-1174-00-00ac-802-11ac-preamble-discussions.ppt.*

Broadcom, "802.11 ac Preamble Proposal" PowerPoint Presentation, Nov. 4, 2009, 13 slides.*

Stacey, Robert, "Proposed Specification Framework for TGac", Jul. 15, 2010, pp. 1 -22, from the internet: https://mentor.ieee.Org/802.11/dcn/09/11 -09-0992-13-00ac-proposed-specification-framework-for-tgac.doc.*

Zhang et al., "802.11 ac Preamble Discussions" Nov. 16, 2009, pp. 1-10. from the internet: https://mentor.ieee.Org/802.11/dcn/09/11 -09-1174-00-00ac-802-11 ac-preamble-discussions.ppt.*

Broadcom, "802.11 ac Preamble Proposal" PowerPoint Presentation, Nov. 4,2009, 13 slides.*

Il-Gu Lee et al., "802.11 ac preamble for VHT auto-detection" May 18, 2010,pp. 1-23. from the internet: https://mentor.ieee.org/802.11/dcn/10/11-10-0359-00-00ac-802-11ac-preamble-for-vht-auto-detection.ppt.*

Stacey, Robert, "Proposed Specification Framework for TGac," (Jul. 15, 2010), pp. 1-22. Retrieved Oct. 26, 2011 from the internet: https://mentor.ieee.org/802.11/dcn/09/11-09-0992-13-00ac-proposed-specification-framework-for-tgac. doc.

Zhang, H. et al, "802.11ac Preamble," IEEE 802.11 (Jan. 18, 2010) pp. 1-11. Retrieved Nov. 22, 2010 from the internet: https://mentor.ieee.org/802.11/dcn/10/11-10-0359-00-00ac-preamble.ppt.

Van Nee, Richard, et al,"VHT-SIG-A2 Fields and Order," IEEE 802.11 (Sep. 9, 2010) pp. 1-9. Retrieved 2011-1026 from internet https://mentor.ieee.org/802.11/dcn/10/11-10-1052-00-00ac-vht-sig-a-and-vht-sig-b-field-structure-.ppt.

PCT Search and Written Opinion for PCT/US2011/044726, dated Nov. 4, 2011.

"IEEE P802.11 Wireless LANs: Specification Framework for TGac". [Online] 2011. https://mentor.ieee.org/802.11/dcn/09/11-09-0992-21-00ac-proposed-specification-framework-for-tgac.doc (accessed Jul. 13, 2011). (pp. 8 and 11-16.).

Kim J., et al., "Bits Consideration for Signal Fields," IEEE 802.11-10/0382r2, May 20, 2010, pp. 1-21.

* cited by examiner

| Bit Index | Field | MU Bit Allocation | SU Bit Allocation |
|---|---|---|---|
| 0-2 | BW | 3 | 3 |
| 3 | STBC | 1 | 1 |
| 4-9 | Group ID | 6 | 6 |
| 10-21 | $N_{STS}$ | 12 | 12 |
| 22-23 | Reserved | 2 | 2 |
| | Total | 24 | 24 |

FIG. 5

| Bit Index | Field | MU Bit Allocation | SU Bit Allocation |
|---|---|---|---|
| 0-1 | Short GI | 2 _602_ | 2 |
| 2-3 | Coding | 2 _604_ | 2 |
| MU: -  SU: 4-7 | MCS | 0 _606_ | 4 |
| MU: -  SU: 8 | SU-Beamformed | 0 _608_ | 1 |
| MU: 4-9  SU: 9 | Reserved | 6 _610_ | 1 |
| 10-17 | CRC | 8 _612_ | 8 |
| 18-23 | Trail | 6 | 6 |
| _614_ | Total | 24 | 24 |

FIG. 6

| Field | MU Bit Allocation | | | SU Bit Allocation | | |
|---|---|---|---|---|---|---|
| | 20 MHz | 40 MHz | 80 MHz | 20 MHz | 40 MHz | 80 MHz |
| 702 — Length | 16 | 17 | 19 | 17 | 19 | 21 |
| 704 — MCS | 4 | 4 | 4 | - | - | - |
| 706 — Reserved | 0 | 0 | 0 | 3 | 2 | 2 |
| 708 — Tail | 6 | 6 | 6 | 6 | 6 | 6 |
| Total # bits | 26 | 27 | 29 | 26 | 27 | 29 |

FIG. 7

METHOD AND APPARATUS FOR ORDERING SUB-FIELDS OF VHT-SIG-A AND VIT-SIG-B FIELDS

CLAIM OF PRIORITY UNDER 35 U.S.C. §119

The present application for patent claims benefit of U.S. Provisional Patent Application Ser. No. 61/366,276, entitled "VHT-SIG-A AND VIT-SIG-B FIELD ORDER", filed Jul. 21, 2010, and U.S. Provisional Patent Application Ser. No. 61/366,682, entitled "VHT-SIG-A AND VIT-SIG-B FIELD ORDER", filed Jul. 22, 2010, and assigned to the assignee hereof and hereby expressly incorporated by reference herein.

BACKGROUND

Field

Certain aspects of the present disclosure generally relate to wireless communications and, more particularly, to a method of ordering Very High Throughput (VHT) signal fields within a preamble.

Background

The Institute of Electrical and Electronics Engineers (IEEE) 802.11 Wide Local Area Network (WLAN) standards body established specifications for transmissions based on the Very High Throughput (VHT) approach using a carrier frequency of 5 GHz (i.e., the IEEE 802.11ac specification), or using a carrier frequency of 60 GHz (i.e., the IEEE 802.11ad specification) targeting aggregate throughputs larger than 1 Gigabits per second. One of the enabling technologies for the VHT 5 GHz specification is a wider channel bandwidth, which bonds two 40 MHz channels for 80 MHz bandwidth therefore doubling the physical layer (PHY) data rate with negligible increase in cost compared to the IEEE 802.11n standard.

A method is proposed in the present disclosure of ordering sub-fields within Signal (SIG) fields of a VHT preamble. In addition, a method is proposed to manage sizes of these sub-fields.

SUMMARY

Certain aspects of the present disclosure provide a method for wireless communications. The method generally includes constructing a Signal (SIG) field with a first portion followed by a second portion, wherein a plurality of sub-fields of the SIG field are allocated between the first and second portions to ensure that a group of the sub-fields common for a Single User (SU) mode and a Multi User (MU) mode is transmitted before another group of the sub-fields not common for the SU and MU modes, and transmitting the SIG field within a preamble.

Certain aspects of the present disclosure provide an apparatus for wireless communications. The apparatus generally includes a circuit configured to construct a Signal (SIG) field with a first portion followed by a second portion, wherein a plurality of sub-fields of the SIG field are allocated between the first and second portions to ensure that a group of the sub-fields common for a Single User (SU) mode and a Multi User (MU) mode is transmitted before another group of the sub-fields not common for the SU and MU modes, and a transmitter configured to transmit the SIG field within a preamble.

Certain aspects of the present disclosure provide an apparatus for wireless communications. The apparatus generally includes means for constructing a Signal (SIG) field with a first portion followed by a second portion, wherein a plurality of sub-fields of the SIG field are allocated between the first and second portions to ensure that a group of the sub-fields common for a Single User (SU) mode and a Multi User (MU) mode is transmitted before another group of the sub-fields not common for the SU and MU modes, and means for transmitting the SIG field within a preamble.

Certain aspects of the present disclosure provide a computer-program product for wireless communications. The computer-program product includes a computer-readable medium comprising instructions executable to construct a Signal (SIG) field with a first portion followed by a second portion, wherein a plurality of sub-fields of the SIG field are allocated between the first and second portions to ensure that a group of the sub-fields common for a Single User (SU) mode and a Multi User (MU) mode is transmitted before another group of the sub-fields not common for the SU and MU modes, and transmit the SIG field within a preamble.

Certain aspects of the present disclosure provide a wireless node. The wireless node generally includes at least one antenna, a circuit configured to construct a Signal (SIG) field with a first portion followed by a second portion, wherein a plurality of sub-fields of the SIG field are allocated between the first and second portions to ensure that a group of the sub-fields common for a Single User (SU) mode and a Multi User (MU) mode is transmitted before another group of the sub-fields not common for the SU and MU modes, and a transmitter configured to transmit via the at least one antenna the SIG field within a preamble.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 5 illustrates an example structure of a Very High Throughput Signal A1 (VHT-SIG-A1) portion of a Very High Throughput Signal field type A (VHT-SIGA field) of a preamble in accordance with certain aspects of the present disclosure.

FIG. 6 illustrates an example structure of a Very High Throughput Signal A2 (VHT-SIG-A2) portion of a VHT-SIGA field of a preamble in accordance with certain aspects of the present disclosure.

FIG. 7 illustrates an example structure of a Very High Throughput Signal field type B (VHT-SIGB field) of a preamble in accordance with certain aspects of the present disclosure.

DETAILED DESCRIPTION

Figure 1:
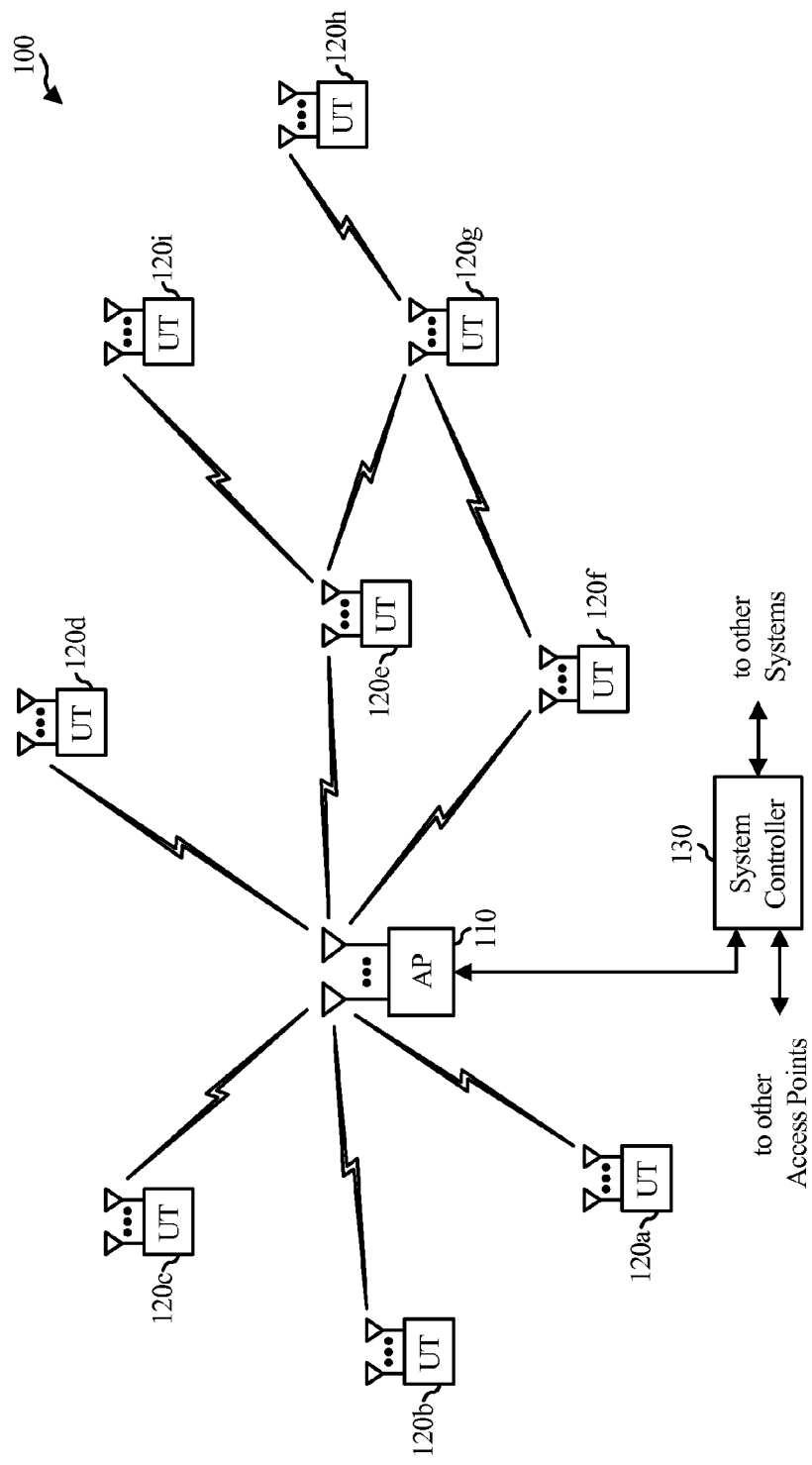
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE ($3^{rd}$ Generation Partnership Project Long Term Evolution) or some other standards known in the art.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

In an aspect of the present disclosure, the AP 110 may construct a preamble of a frame to be transmitted to the user terminals 120 in accordance with Very High Throughput (VHT) wireless communications standard. The present disclosure proposes a particular order of sub-fields within Signal (SIG) fields of the preamble, as well as a method of managing sizes of these sub-fields.

Figure 2:
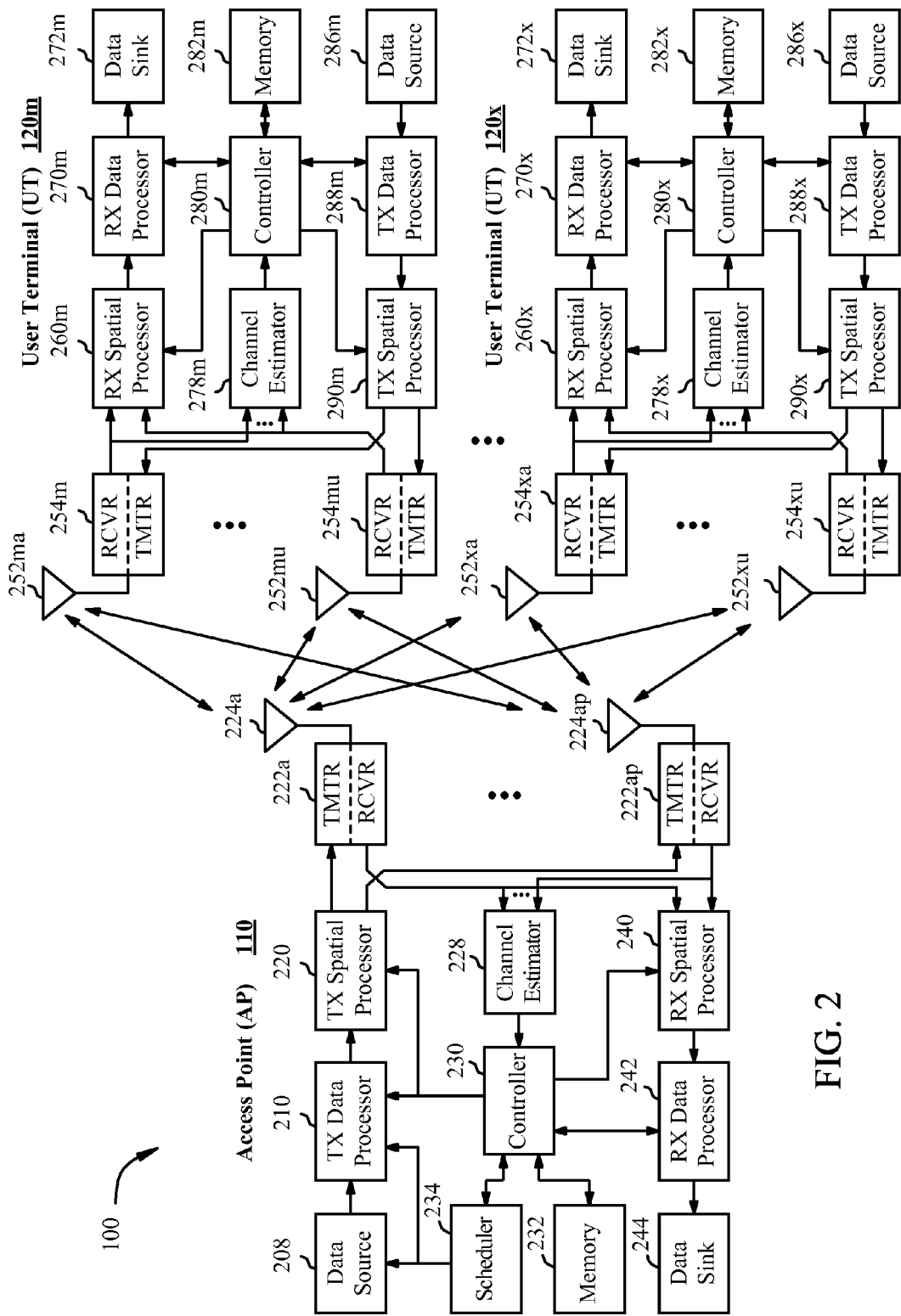
FIG. 2 illustrates a block diagram of an example access point and user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas.

Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

In an aspect of the present disclosure, the TX data processor 210 of the access point 110 may be configured to construct a preamble of a frame for transmission from the access point 110 to the user terminals 120 in accordance with the VHT wireless communications standard. In another aspect, the TX data processor 288 of the user terminal 120 may be configured to construct another preamble for transmission from the user terminal 120 to the access point 110 in accordance with the VHT wireless communications standard. Both the preamble and the other preamble may comprise the same structure. The present disclosure proposes a particular order of sub-fields within SIG fields of the preamble (and of the other preamble), as well as a method of managing sizes of these sub-fields.

Figure 3:
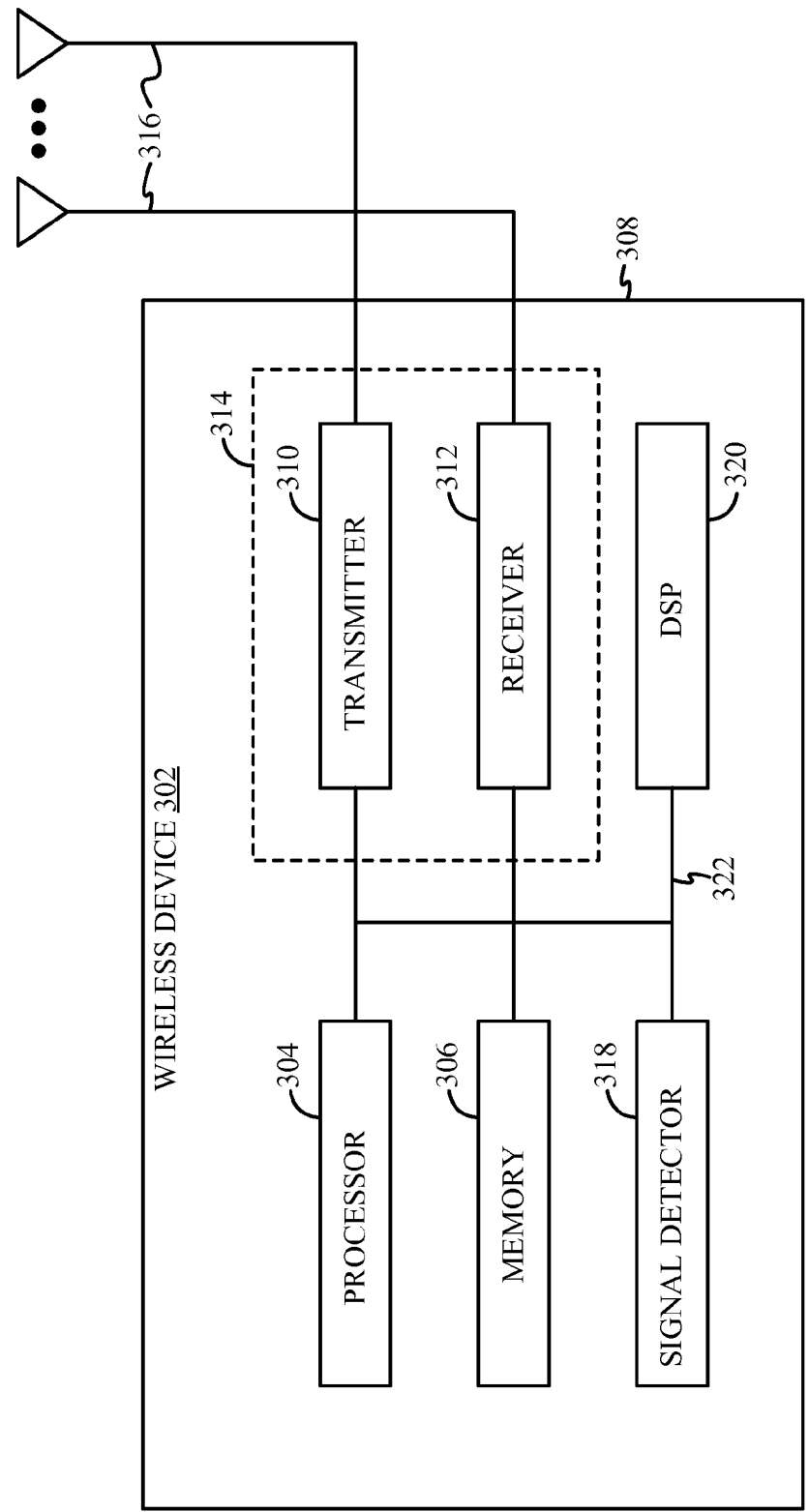
FIG. 3 illustrates a block diagram of an example wireless device in accordance with certain aspects of the present disclosure.

FIG. 3 illustrates various components that may be utilized in a wireless device 302 that may be employed within the wireless communication system 100. The wireless device 302 is an example of a device that may be configured to implement the various methods described herein. The wireless device 302 may be a base station 104 or a user terminal 106.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In an aspect of the present disclosure, the processor 304 of the wireless device 302 may be configured to construct a preamble of a frame for transmission to user terminals or an access point (not shown) in accordance with the VHT wireless communications standard. The present disclosure proposes a particular order of sub-fields within SIG fields of the preamble, as well as a method of managing sizes of these sub-fields.

Preamble Structure

Figure 4:
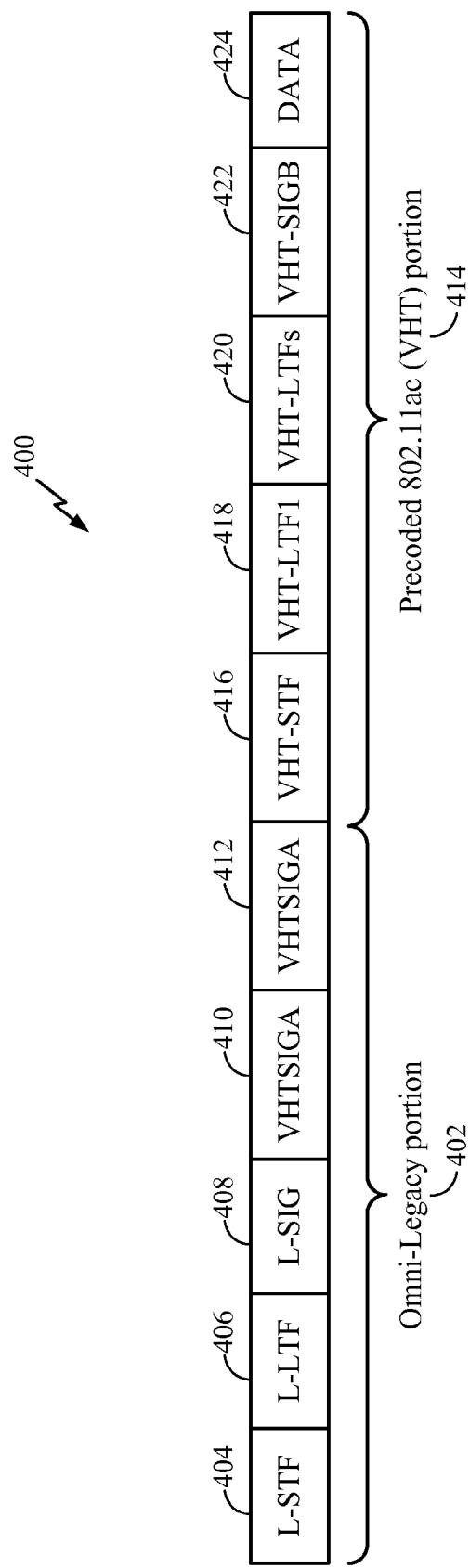
FIG. 4 illustrates an example structure of a preamble that may be transmitted from an access point or a user terminal in accordance with certain aspects of the present disclosure.

FIG. 4 illustrates an example structure of a preamble 400 of a frame in accordance with certain aspects of the present disclosure. The preamble 400 may be transmitted in accordance with IEEE 802.11 family of wireless communications standards (e.g., in accordance with the VHT standard), from the AP 110 to the user stations 120 of the wireless network 100 illustrated in FIG. 1, or from a user station 120 to the AP 110.

The preamble 400 may comprise an omni-legacy portion 402 and a precoded VHT portion 414. The legacy portion 402 may comprise at least one of: a Legacy Short Training Field (L-STF) 404, a Legacy Long Training Field 406, a Legacy Signal (L-SIG) field 408, or two OFDM symbols 410, 412 of Very High Throughput Signal fields type A (VHT-SIG-A fields). In an aspect of the present disclosure, the VHT-SIG-A fields 410, 412 may be transmitted omni-directionally.

The precoded VHT portion 414 may comprise at least one of: a Very High Throughput Short Training Field (VHT-STF) 416, a Very High Throughput Long Training Field 1 (VHT-LTF1) 418, Very High Throughput Long Training Fields (VHT-LTFs) 420, a Very High Throughput Signal field type B (VHT-SIG-B field 422), or a data packet 424. In an aspect of the present disclosure, the VHT-SIG-B field 422 may comprise one OFDM symbol, and it may be transmitted after the VHT-SIG-A field, as illustrated in FIG. 4. According to certain aspects, the VHT portion 414 may be transmitted precoded and beamformed.

A robust multi-user (MU) MIMO reception at a user site may require that the AP transmits all the VHT-LTFs 420 to all supported users of a wireless communications system. The VHT-LTFs 420 may allow each user to estimate a MIMO channel from all AP antennas to antennas of that user. Then, that user may utilize the channel estimates in order to perform interference nulling/suppression from MU-MIMO streams dedicated to other users. To achieve robust interference cancellation/suppression, each user may be required to know which spatial stream(s) belong(s) to that user, as well as which spatial streams belong to other users. This information may be signaled in at least one of the VHT-SIG-A field or the VHT-SIG-B field.

Ordering of Sub-Fields within VHT-SIG-A and VHT-SIG-B Fields of Preamble

Certain aspects of the present disclosure propose ordering of sub-fields within VHT-SIG-A and VHT-SIG-B fields of a preamble, as well as a method of managing sizes of these sub-fields. For simplified parsing at a user terminal, those sub-fields that may be common for Single User (SU) and Multi User (MU) transmission modes may be scheduled first for transmission. In an aspect, all sub-fields of the VHT-SIG-A and VHT-SIG-B may be transmitted such that a Least Significant Bit (LSB) of each sub-field may be transmitted first.

FIG. 5 illustrates an example structure of a Very High Throughput Signal A1 (VHT-SIG-A1) portion 500 of a VHT-SIG-A field of a preamble in accordance with certain aspects of the present disclosure. As illustrated in FIG. 5, the VHT-SIG-A1 portion 500 may comprise at least one of: a Bandwidth (BW) indication sub-field 502, a Space Time Block Code (STBC) sub-field 504, a group identifier (ID) sub-field 506, a space-time stream (STS) sub-field 508 with information about a number of space-time streams dedicated for each user, or a Reserved sub-field 510.

The BW indication sub-field 502 may comprise three bits for both MU and SU transmissions, i.e., bit indexes 0-2, as illustrated in FIG. 5. This sub-field may allow at least one of 20 MHz, 40 MHz, 80 MHz, 80 MHz+80 MHz, or 160 MHz transmission modes. For example, the value of BW indication sub-field equal to zero may indicate the 20 MHz transmission, the value of one may indicate the 40 MHz transmission, the value of two may indicate the 80 MHz transmission, and the value of three may indicate the 160 MHz transmission or the 80 MHz+80 MHz transmission. In an aspect, if a Most Significant Bit (MSB) is not used, this bit may be reserved and set to '1'.

The STBC sub-field 504 may comprise one bit for both MU and SU transmissions, i.e., a bit index 3, as illustrated in FIG. 5. In an aspect, this sub-field may indicate Alamouti transmission scheme, and it may be set to '1' for STBC and to '0' otherwise.

The group ID sub-field 506 may comprise six bits for both MU and SU transmissions, i.e., bit indexes 4-9, as illustrated in FIG. 5. In an aspect of the present disclosure, a predefined value (e.g., zero) in the group ID sub-field 506 may indicate at least one of: SU transmission, a transmission where the group membership has not yet been established, or a transmission that requires bypassing a group of one or more apparatuses (e.g., a broadcast transmission).

The STS sub-field 508 may comprise 12 bits for both MU and SU transmissions, i.e., bit indexes 10-21, as illustrated in FIG. 5. In the case of MU transmission, three bits of this sub-field may be allocated per user with maximum of four users being supported. For each of the supported user, the value of zero may indicate no space-time streams dedicated for that user, the value of one may indicate one space-time stream dedicated for that user, the value of two may indicate two space-time streams dedicated for that user, the value of three may indicate three space-time streams dedicated for that user, and the value of four may indicate four space-time streams dedicated for that user.

In the case of SU transmission, first 3 bits of the STS sub-field 508 may comprise information about stream allocation. For example, the value of zero may indicate allocation of one space-time stream for a supported user, the value of one may indicate allocation of two space-time streams for the user, and so on. Remaining nine bits of the STS sub-field 508 may comprise partial information about association identifier (AID), e.g., these bits may represent nine LSB bits of the AID. For broadcast, multicast and STA-to-AP transmission, these nine bits may be set to all zeros.

The Reserved sub-field 510 may comprise two bits for both MU and SU transmissions, i.e., bit indexes 22-23, as illustrated in FIG. 5. In an aspect, the reserved bits 510 may be set to all ones.

In an aspect of the present disclosure, the reserved bits 510 may be included into the VHT-SIG-A1 portion 500 to allow for extension of at least one of the group ID sub-field 506 or the STS sub-field 508. For example, in the SU transmission mode, the STS sub-field 508 may be extended from 12 to 14 bits. The first three bits may still indicate a number of allocated space-time streams, while the following eleven bits may comprise a full AID instead of a partial AID.

FIG. 6 illustrates an example structure of a Very High Throughput Signal A2 (VHT-SIG-A2) portion 600 of a VHT-SIG-A field of a preamble in accordance with certain aspects of the present disclosure. The VHT-SIG-A2 portion 600 may be transmitted following the transmission of the VHT-SIG-A1 portion 500 of the VHT-SIG-Afield. As illustrated in FIG. 6, the VHT-SIG-A2 portion 600 may comprise at least one of: a Short Guard Interval (GI) sub-field 602, a Coding sub-field 604, a Modulation-Coding Scheme (MCS) sub-field 606 (transmitted only in the case of SU transmission mode), a SU-Beamformed sub-field 608 (transmitted only in the case of SU transmission mode), a Reserved sub-field 610, a Cyclic Redundancy Check (CRC) sub-field 612, or a Tail sub-field 614.

The Short GI sub-field 602 may comprise two bits for both MU and SU transmissions, i.e., bit indexes 0-1, as illustrated in FIG. 6. In an aspect, one bit of this sub-field may indicate long or short GI (e.g., LSB). For example, the LSB may be set to '1' when indicating the short GI. In an aspect, the MSB may be utilized to indicate short GI packet length ambiguity mitigation. For example, the MSB may be set to '1' when indicating short GI and $N_{sym}$% 10=9 (i.e., when, in case of short GI, the number of OFDM symbols modulo 10 equals 9).

The Coding sub-field 604 may comprise eight bits for MU transmission (e.g., two bits per user) or two bits for SU transmission, i.e., bit indexes 2-9 for MU transmission or bit indexes 2-3 for SU transmission, as illustrated in FIG. 6. For SU transmission, one bit (e.g., LSB) may indicate Low Density Parity Check (LDPC) coding versus Block Channel Coding (BCC). For example, the LSB may be set to '0' for BCC, and it may be set to '1' for LDPC. In an aspect, if MSB of this sub-field is not used, then it may be reserved and set to '1'. For MU transmission, two bits of the Coding sub-field 604 may be allocated per user. For example, each user LSB may be set to '0' for BCC and set to '1' for LDPC.

The MCS sub-field 606 may comprise four bits in the case of SU transmission (i.e., bit indexes 4-7, as illustrated in FIG. 6). This sub-field may not exist in the case of MU transmission, and MCS may be then signaled within the VHT-SIG-B field of the preamble.

The SU-Beamformed sub-field 608 may comprise one bit in the case of SU transmission (i.e., a bit index 8, as illustrated in FIG. 6). This sub-field may not exist in the case of MU transmission. In an aspect of the present disclosure, the value of SU-Beamformed sub-field may be set to '1' when a transmission packet represents SU-beamformed packet. Otherwise, this sub-field may be set to '0'. In another aspect, the SU-Beamformed bit 608 may be reserved and set to '1'.

The Reserved sub-field 610 may comprise one bit in the case of SU transmission (i.e., a bit index 9, as illustrated in FIG. 6). This reserved bit 610 may be transmitted only in the case of SU transmission mode, and it may be set to '1'.

The CRC sub-field 612 may comprise eight bits for both MU and SU transmissions, i.e., bit indexes 10-17, as illustrated in FIG. 6. In an aspect of the present disclosure, the CRC sum may be calculated as specified for IEEE 802.11n wireless communications standard. In this case, C7 bit of the CRC sum may be transmitted first; C6 bit of the CRC sum may be transmitted second, and so on.

The Tail sub-field 614 may comprise six bits for both MU and SU transmissions, i.e., bit indexes 18-23, as illustrated in FIG. 6. In an aspect, the Tail bits 614 may be all zeros.

FIG. 7 illustrates an example structure 700 of a Very High Throughput Signal field type B (VHT-SIG-B field) of a preamble in accordance with certain aspects of the present disclosure. As illustrated in FIG. 7, the VHT-SIG-B field 700 may comprise at least one of: a Length sub-field 702, a Modulation-Coding Scheme (MCS) sub-field 704, a Reserved sub-field 706, or a Tail sub-field 708. In an aspect, the Length sub-field 702 may be transmitted first followed by the MSC sub-field 704, the Reserved sub-field 706, and the Tail sub-field 708. In an aspect, all sub-fields of the VHT-SIG-B field may be transmitted such that LSB of each sub-field is transmitted first.

In an aspect of the present disclosure, the Length sub-field 702 may comprise an indication about a length of useful data within a physical layer convergence procedure (PLCP) service data unit (PSDU) following the preamble, in units of four octets. As illustrated in FIG. 7, the MCS sub-field 704 may comprise four bits for all supported bandwidth sizes (i.e., bandwidth sizes of 20 MHz, 40 MHz and 80 MHz), and it may be utilized only in the case of MU transmission.

On the other hand, the reserved bits 706 may be only employed in the case of SU transmission. The number of reserved bits 706 may depend on utilized bandwidth size, e.g., three bits may be allocated for 20 MHz transmission bandwidth and two bits may be employed for 40 MHz and 80 MHz bandwidths. In an aspect, the reserved bits 706 may be set to all ones.

The Tail sub-field 708 may comprise six bits for all supported bandwidth sizes and for both MU and SU transmissions, as illustrated in FIG. 7. In an aspect, the Tail bits 708 may be set to all zeros.

In an aspect of the present disclosure, a CRC sum may be a part of a SERVICE field of a preamble. For example the CRC sum may be calculated as specified for the IEEE 802.11n wireless communications standard. In this case, C7 bit of the CRC sum may be transmitted first, and it may be mapped to B8 bit of the SERVICE field. Furthermore, C6 bit of the CRC sum may be transmitted second and mapped to B9 bit of the SERVICE field, and so on. Finally, C0 bit of the CRC sum may be transmitted last and mapped to B15 bit of the SERVICE field.

Figure 8:
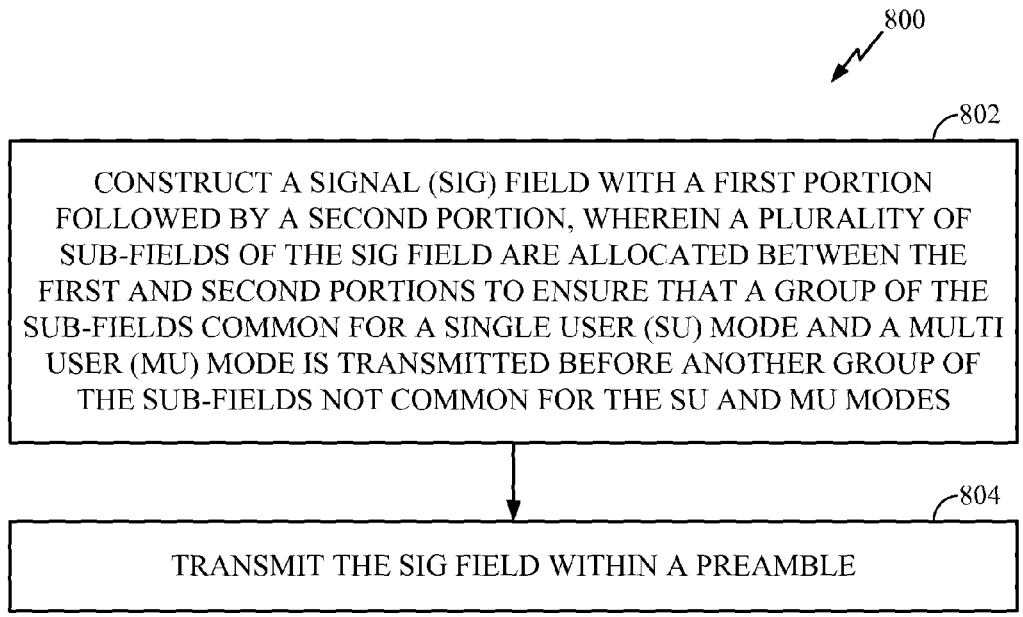
FIG. 8 illustrates example operations that may be performed at an access point or a user terminal for constructing a preamble in accordance with certain aspects of the present disclosure.

FIG. 8 illustrates example operations 800 that may be performed at a wireless node (e.g., an access point or a user terminal) for constructing a preamble in accordance with certain aspects of the present disclosure. At 802, the wireless node may construct a Signal (SIG) field (e.g., a VHT-SIG-A field) with a first portion (e.g., a VHT-SIG-A1 portion) followed by a second portion (e.g., a VHT-SIG-A2 portion), wherein a plurality of sub-fields of the SIG field may be allocated between the first and second portions to ensure that a group of the sub-fields common for a Single User (SU) mode and a Multi User (MU) mode may be transmitted before another group of the sub-fields not common for the SU and MU modes. At 804, the wireless node may transmit the SIG field within the preamble to one or more other wireless nodes (e.g., user stations or another access point).

In an aspect of the present disclosure, the access point may construct another SIG field (e.g., a VHT-SIG-B field) within the preamble with at least one of a Length sub-field, a Modulation-Coding Scheme (MCS) sub-field, a Tail sub-field, or reserved bits. The Length sub-field may comprise an indication about a length of data transmitted following the preamble.

In an aspect of the present disclosure, the SIG field and the other SIG field may be transmitted within the preamble to only one apparatus (user terminal) in the case of the SU mode. Also, the SIG field and the other SIG field may be transmitted within the preamble to two or more apparatuses (user terminals) for the MU mode.

In another aspect of the present disclosure, a user terminal my construct the SIG fields (e.g., the VHT-SIG-A and VHT-SIG-B fields) and transmit them within the preamble to an access point or to one or more user terminals.

In summary, certain aspects of the present disclosure support allocating sub-fields in the VHT-SIG-A field between the VHT-SIG-A1 and VHT-SIG-A2 portions such that those sub-fields common for the SU transmission mode and the MU transmission mode may be transmitted first. In an aspect of the present disclosure, one or more sub-fields common for the SU and MU transmission modes may be differently interpreted (i.e., may comprise different information) for the SU mode and for the MU mode, such as the STS sub-field 508 of the VHT-SIG-A1 portion 500 illustrated in FIG. 5. In addition, size and order of sub-fields of the VHT-SIG-B field are defined.

Figure 8A:
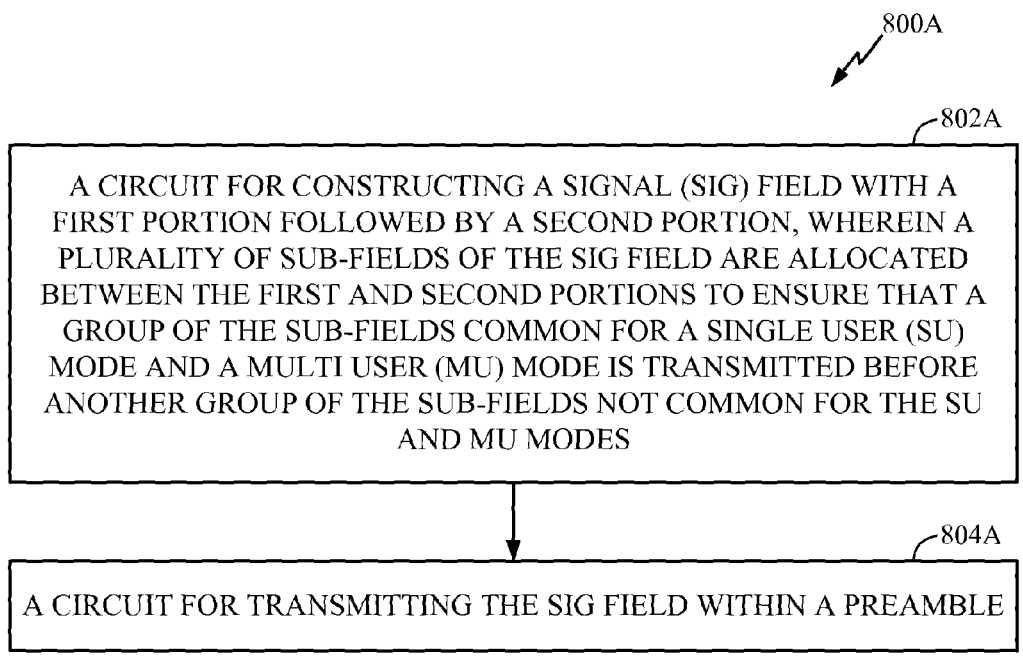
FIG. 8A illustrates example components capable of performing the operations shown in FIG. 8.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 800 illustrated in FIG. 8 correspond to components 800A illustrated in FIG. 8A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of a list of" items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

For example, the means for transmitting may comprise a transmitter, e.g., the transmitter 222 from FIG. 2 of the access point 110, the transmitter 254 from FIG. 2 of the user terminal 120, or the transmitter 310 from FIG. 3 of the wireless device 302. The means for constructing may comprise an application specific integrate circuit, e.g., the processor 210 from FIG. 2 of the access point 110, the processor 288 from FIG. 2 of the user terminal 120, or the processor 304 from FIG. 3 of the wireless device 302. The means for utilizing may comprise an application specific integrate circuit, e.g., the processor 210, the processor 288, or the processor 304.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
using a Signal (SIG) field with a first portion followed by a second portion, wherein a plurality of sub-fields of the SIG field are allocated between the first and second portions by ordering a first group of the sub-fields common for a Single User (SU) mode and a Multi User (MU) mode to be transmitted before a second group of the sub-fields not common for the SU and MU modes, wherein the first portion comprises a group ID sub-field; and
transmitting the SIG field within a preamble.

2. The method of claim 1, wherein the SIG field comprises a Very High Throughput Signal field type A (VHT-SIG-A field).

3. The method of claim 1, wherein:
the SIG field is transmitted to only one apparatus for the SU mode, and
the SIG field is transmitted to two or more apparatuses for the MU mode.

4. The method of claim 1, wherein one or more sub-fields from the first group comprise different information for the SU mode and for the MU mode.

5. The method of claim 4, wherein the one or more sub-fields comprise a space-time stream (STS) sub-field with information about a number of space-time streams dedicated for each apparatus to which the preamble is transmitted.

6. The method of claim 1, further comprising:
utilizing one or more reserved bits in the first portion to extend at least one of the group ID sub-field or a space-time stream (STS) sub-field of the first group of sub-fields, wherein
the STS sub-field comprises information about a number of space-time streams dedicated for each apparatus to which the preamble is transmitted, and
the group ID sub-field comprises information about a group of apparatuses to which the preamble is transmitted.

7. The method of claim 6, wherein:
the STS sub-field is extended in the SU mode to 14 bits by utilizing the one or more reserved bits,
three bits of the STS sub-field indicate a number of space-time streams dedicated to that apparatus, and
eleven bits of the STS sub-field comprise at least a part of an Association Identifier (AID) of that apparatus.

8. The method of claim 1, further comprising:
using another SIG field within the preamble with at least one of a Length sub-field, a Modulation-Coding Scheme (MCS) sub-field, a Tail sub-field, or reserved bits,
wherein the Length sub-field comprises an indication about a length of data to be transmitted after the preamble.

9. The method of claim 8, further comprising:
transmitting the Length sub-field followed by the MCS sub-field, the reserved bits and the Tail sub-field.

10. The method of claim 8, wherein:
the other SIG field comprises a Very High Throughput Signal field type B (VHT-SIG-B field), and
the VHT-SIG-B field is transmitted within the preamble after transmitting a Very High Throughput Signal field type A (VHT-SIG-A field).

11. The method of claim 1, wherein the preamble is transmitted in accordance with IEEE 802.11 family of wireless communications standards.

12. An apparatus for wireless communications, comprising:
a circuit configured to use a Signal (SIG) field with a first portion followed by a second portion, wherein a plurality of sub-fields of the SIG field are allocated between the first and second portions by ordering a first group of the sub-fields common for a Single User (SU) mode and a Multi User (MU) mode to be transmitted before a second group of the sub-fields not common for the SU and MU modes, wherein the first portion comprises a group ID sub-field; and
a transmitter configured to transmit the SIG field within a preamble.

13. The apparatus of claim 12, wherein the SIG field comprises a Very High Throughput Signal field type A (VHT-SIG-A field).

14. The apparatus of claim 12, wherein:
the SIG field is transmitted to only one apparatus for the SU mode, and
the SIG field is transmitted to two or more apparatuses for the MU mode.

15. The apparatus of claim 12, wherein one or more sub-fields from the first group comprise different information for the SU mode and for the MU mode.

16. The apparatus of claim 15, wherein the one or more sub-fields comprise a space-time stream (STS) sub-field with information about a number of space-time streams dedicated for each apparatus to which the preamble is transmitted.

17. The apparatus of claim 12, further comprising:
another circuit configured to utilize one or more reserved bits in the first portion to extend at least one of the group ID sub-field or a space-time stream (STS) sub-field of the first group of sub-fields, wherein:
the STS sub-field comprises information about a number of space-time streams dedicated for each apparatus to which the preamble is transmitted, and
the group ID sub-field comprises information about a group of apparatuses to which the preamble is transmitted.

18. The apparatus of claim 17, wherein:
the STS sub-field is extended in the SU mode to 14 bits by utilizing the one or more reserved bits,
three bits of the STS sub-field indicate a number of space-time streams dedicated to that apparatus, and
eleven bits of the STS sub-field comprise at least a part of an Association Identifier (AID) of that apparatus.

19. The apparatus of claim 12, further comprising:
another circuit configured to use another SIG field within the preamble with at least one of a Length sub-field, a Modulation-Coding Scheme (MCS) sub-field, a Tail sub-field, or reserved bits,
wherein the Length sub-field comprises an indication about a length of data to be transmitted after the preamble.

20. The apparatus of claim 19, wherein the transmitter is also configured to:
transmit the Length sub-field followed by the MCS sub-field, the reserved bits and the Tail sub-field.

21. The apparatus of claim 19, wherein:
the other SIG field comprises a Very High Throughput Signal field type B (VHT-SIG-B field), and
the VHT-SIG-B field is transmitted within the preamble after transmitting a Very High Throughput Signal field type A (VHT-SIG-A field).

22. The apparatus of claim 12, wherein the preamble is transmitted in accordance with IEEE 802.11 family of wireless communications standards.

23. An apparatus for wireless communications, comprising:
 means for using a Signal (SIG) field with a first portion followed by a second portion, wherein a plurality of sub-fields of the SIG field are allocated between the first and second portions by ordering a first group of the sub-fields common for a Single User (SU) mode and a Multi User (MU) mode to be transmitted before a second group of the sub-fields not common for the SU and MU modes, wherein the first portion comprises a group ID sub-field; and
 means for transmitting the SIG field within a preamble.

24. The apparatus of claim 23, wherein the SIG field comprises a Very High Throughput Signal field type A (VHT-SIG-A field).

25. The apparatus of claim 23, wherein:
 the SIG field is transmitted to only one apparatus for the SU mode, and
 the SIG field is transmitted to two or more apparatuses for the MU mode.

26. The apparatus of claim 23, wherein one or more sub-fields from the first group comprise different information for the SU mode and for the MU mode.

27. The apparatus of claim 26, wherein the one or more sub-fields comprise a space-time stream (STS) sub-field with information about a number of space-time streams dedicated for each apparatus to which the preamble is transmitted.

28. The apparatus of claim 23, further comprising:
 means for utilizing one or more reserved bits in the first portion to extend at least one of the group ID sub-field or a space-time stream (STS) sub-field of the first group of sub-fields, wherein
 the STS sub-field comprises information about a number of space-time streams dedicated for each apparatus to which the preamble is transmitted, and
 the group ID sub-field comprises information about a group of apparatuses to which the preamble is transmitted.

29. The apparatus of claim 28, wherein:
 the STS sub-field is extended in the SU mode to 14 bits by utilizing the one or more reserved bits,
 three bits of the STS sub-field indicate a number of space-time streams dedicated to that apparatus, and
 eleven bits of the STS sub-field comprise at least a part of an Association Identifier (AID) of that apparatus.

30. The apparatus of claim 23, further comprising:
 means for using another SIG field within the preamble with at least one of a Length sub-field, a Modulation-Coding Scheme (MCS) sub-field, a Tail sub-field, or reserved bits,
 wherein the Length sub-field comprises an indication about a length of data to be transmitted after the preamble.

31. The apparatus of claim 30, wherein the means for transmitting is further configured to:
 transmit the Length sub-field followed by the MCS sub-field, the reserved bits and the Tail sub-field.

32. The apparatus of claim 30, wherein:
 the other SIG field comprises a Very High Throughput Signal field type B (VHT-SIG-B field), and
 the VHT-SIG-B field is transmitted within the preamble after transmitting a Very High Throughput Signal field type A (VHT-SIG-A field).

33. The apparatus of claim 23, wherein the preamble is transmitted in accordance with IEEE 802.11 family of wireless communications standards.

34. A computer-program product for wireless communications, comprising a non-transitory computer-readable medium comprising instructions executable to:
 use a Signal (SIG) field with a first portion followed by a second portion, wherein a plurality of sub-fields of the SIG field are allocated between the first and second portions by ordering a first group of the sub-fields common for a Single User (SU) mode and a Multi User (MU) mode to be transmitted before a second group of the sub-fields not common for the SU and MU modes, wherein the first portion comprises a group ID sub-field; and
 transmit the SIG field within a preamble.

35. A wireless node, comprising:
 at least one antenna;
 a circuit configured to use a Signal (SIG) field with a first portion followed by a second portion, wherein a plurality of sub-fields of the SIG field are allocated between the first and second portions by ordering a first group of the sub-fields common for a Single User (SU) mode and a Multi User (MU) mode to be transmitted before a second group of the sub-fields not common for the SU and MU modes, wherein the first portion comprises a group ID sub-field; and
 a transmitter configured to transmit the SIG field within a preamble via the at least one antenna.

36. The method of claim 1 wherein, a predefined value in the group ID sub-field indicates at least one of an SU transmission, a transmission where a group membership has not been established, or a transmission that requires bypassing a group of one or more apparatuses.

37. The method of claim 36, wherein the predefined value is zero.

38. The apparatus of claim 12, wherein a predefined value in the group ID sub-field indicates at least one of an SU transmission, a transmission where a group membership has not been established, or a transmission that requires bypassing a group of one or more apparatuses.

39. The apparatus of claim 38, wherein the predefined value is zero.

40. The apparatus of claim 23, wherein a predefined value in the group ID sub-field indicates at least one of an SU transmission, a transmission where a group membership has not been established, or a transmission that requires bypassing a group of one or more apparatuses.

41. The apparatus of claim 40, wherein the predefined value is zero.

42. The computer program of claim 34, wherein a predefined value in the group ID sub-field indicates at least one of an SU transmission, a transmission where a group membership has not been established, or a transmission that requires bypassing a group of one or more apparatuses.

43. The computer program of claim 42, wherein the predefined value is zero.

44. The wireless node of claim 35, wherein a predefined value in the group ID sub-field indicates at least one of an SU transmission, a transmission where a group membership has not been established, or a transmission that requires bypassing a group of one or more apparatuses.

45. The wireless node of claim 44, wherein the predefined value is zero.

46. The method of claim 1, wherein the first portion comprises at least one of a bandwidth (BW) indication sub-field or a Reserved sub-field, and wherein the second portion comprises at least one of a Short Guard Interval (GI) sub-field, a Coding sub-field, a Modulation-Coding Scheme (MCS) sub-field, a SU-Beamformed sub-field, a Reserved sub-field, a Cyclic Redundancy Check (CRC) sub-field, or a Tail sub-field.

\* \* \* \* \*